US012631503B2

(12) United States Patent
Song et al.

(10) Patent No.: US 12,631,503 B2
(45) Date of Patent: May 19, 2026

(54) COMBINED SIX-DIMENSIONAL FORCE SENSOR BASED ON THIN-FILM SPUTTERING TECHNOLOGY

(71) Applicant: SOUTHEAST UNIVERSITY, Jiangsu (CN)

(72) Inventors: Aiguo Song, Jiangsu (CN); Yuhan Chen, Jiangsu (CN); Jingjing Xu, Jiangsu (CN); Baoguo Xu, Jiangsu (CN); Huijun Li, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 285 days.

(21) Appl. No.: 18/649,980

(22) Filed: Apr. 29, 2024

(65) Prior Publication Data

US 2024/0328872 A1 Oct. 3, 2024

Related U.S. Application Data

(63) Continuation of application No. PCT/CN2023/089136, filed on Apr. 19, 2023.

(30) Foreign Application Priority Data

Apr. 3, 2023 (CN) .......................... 202310345927.8

(51) Int. Cl.
*G01L 1/22* (2006.01)
*G01L 1/20* (2006.01)

(52) U.S. Cl.
CPC ............ *G01L 1/2206* (2013.01); *G01L 1/205* (2013.01)

(58) Field of Classification Search
CPC .............................. G01L 1/2206; G01L 1/205
See application file for complete search history.

(56) References Cited

U.S. PATENT DOCUMENTS 10,527,508 B2 * 1/2020 Berme .................. G01L 1/2281
2024/0328876 A1 * 10/2024 Song ..................... G01L 5/1627

FOREIGN PATENT DOCUMENTS

CN 101672705 3/2010
CN 205120297 U * 3/2016
CN 106918418 A * 7/2017 .............. G01L 5/16
CN 107044898 8/2017

(Continued)

OTHER PUBLICATIONS

"International Search Report (Form PCT/ISA/210) of PCT/CN2023/089136", mailed on Jan. 2, 2024, with English translation thereof, pp. 1-4.

(Continued)

*Primary Examiner* — Jamel E Williams
(74) *Attorney, Agent, or Firm* — JCIPRNET

(57) ABSTRACT

A combined six-dimensional force sensor based on thin-film sputtering technology includes a force transmission table, a cross beam, a base, a top cover, a bottom cover and strain gauges. Strain gauges are sputtered on the elastomer structure to form six sets of Wheatstone bridges. The measurement method of the six-dimensional force sensor is that: an input force/moment of a certain dimension acts on the elastomer structure including the force transmission table and the cross beam through the top cover, the cross beam is deformed and resistance values of strain gauges at corresponding positions change, and output voltages of corresponding bridges change.

2 Claims, 4 Drawing Sheets

(56)  References Cited

FOREIGN PATENT DOCUMENTS

| CN | 206648770 | | | 11/2017 | | |
|----|-----------|---|---|---------|---|---|
| CN | 206648770 | U | * | 11/2017 | | |
| CN | 108981987 | | | 12/2018 | | |
| CN | 108981987 | A | * | 12/2018 | ........... | G01L 1/2262 |
| CN | 209878197 | U | * | 12/2019 | | |
| CN | 111272328 | | | 6/2020 | | |
| CN | 111272328 | B | * | 11/2020 | ........... | G01L 5/1627 |
| CN | 114608739 | A | * | 6/2022 | ........... | G01L 5/1627 |
| CN | 114720028 | | | 7/2022 | | |
| JP | 2650058 | B2 | * | 9/1997 | | |
| JP | 4764619 | B2 | * | 9/2011 | ........... | G01L 1/2237 |
| JP | 2018146309 | A | * | 9/2018 | | |
| KR | 101372308 | B1 | * | 3/2014 | ........... | B25J 11/006 |
| WO | 2017215333 | | | 12/2017 | | |

OTHER PUBLICATIONS

"Written Opinion of the International Searching Authority (Form PCT/ISA/237) of PCT/CN2023/089136", mailed on Jan. 2, 2024, with English translation thereof, pp. 1-4.

* cited by examiner

COMBINED SIX-DIMENSIONAL FORCE SENSOR BASED ON THIN-FILM SPUTTERING TECHNOLOGY

CROSS-REFERENCE TO RELATED APPLICATION

This application is a continuation of international application of PCT application serial no. PCT/CN2023/089136 filed on Apr. 19, 2023, which claims the priority benefit of China application no. 202310345927.8, filed on Apr. 3, 2023. The entirety of each of the above mentioned patent applications is hereby incorporated by reference herein and made a part of this specification.

BACKGROUND

Technical Field

The present disclosure belongs to the technical field of sensors, and particularly relates to a combined six-dimensional force sensor based on thin-film sputtering technology.

Description of Related Art

A multi-dimensional force sensor is capable to measure the contact force/moment from any directions applied on the sensor or the environment. As a basis for an intelligent measurement and control system to smoothly complete subsequent force feedback and force control, the multi-dimensional force sensors are first applied in the field of intelligent robots, and in recent years have been widely used in the fields of aerospace, medical engineering, automotive industry, etc. The currently widely used and mature cross-beam structure is referred to for design of many force sensors. Through strain gauges, a force signal is converted into an electrical signal output with a definite corresponding relationship to achieve the measurement of force components and moment components.

The traditional method of pasting strain gauges commonly used in the development process of multi-dimensional force sensors has the defects of glue volatilization, moisture absorption and temperature dependence that might lead to performance degradation. Therefore, it is of great practical significance to sputter strain gauges through thin-film sputtering technology.

SUMMARY

In order to solve the above problems, the present disclosure discloses a combined six-dimensional force sensor based on thin-film sputtering technology. The sensor has the advantages of high sensitivity and low inter-dimensional coupling, and is suitable for multi-dimensional force measurement in the aerospace field.

In order to realize the above objective, the present disclosure provides a technical solution as follows:

a combined six-dimensional force sensor based on thin-film sputtering technology, including a force transmission table, a cross beam, a base, a top cover, a bottom cover and strain gauges;

the force transmission table is a cylinder of a cuboid structure and has a square section; and four threaded holes are machined separately on upper and lower surfaces of the force transmission table, which are configured for connecting with the top cover and the cross beam respectively;

the cross beam includes a center boss, main beams, floating beams and square corners, where the center boss is a cylinder of a cuboid structure located at the center of the cross beam and has a square section; four through holes are formed on the center boss, during assembly, four bolts are used for fit connection with the threaded holes formed on a lower surface of the force transmission table from bottom to top through a bottom surface of the center boss, to fix the force transmission table above the center boss of the cross beam; the force or moment is applied on the upper surface of the force transmission table through the top cover, and is then transmitted to the center boss of the cross beam through the force transmission table; four side surfaces of the center boss are connected with the main beams; the main beams are four rectangular beams with a rectangular section; one end of each main beam is connected with the center boss, and the other end thereof is connected with a corresponding floating beam; the floating beams located on peripheries of the cross beam are four rectangular thin-walled beams with a rectangular section; the center of an inner side surface of each floating beam is connected with a corresponding main beam, and both ends thereof are connected with the corresponding square corners; the square corners located at four corners of the cross beam are four cylinders of a cuboid structure with a square section; four connecting holes are formed on the square corners for connection with a middle plate of the base;

when assembling the sensor, the force transmission table is connected with the cross beam in a threaded manner; connecting holes of square corners of the cross beam are connected with threads on the middle plate of the base, the top cover is connected with the force transmission table in a threaded manner; the bottom cover is connected with the base through mounting holes; and a measurement principle of the six-dimensional force sensor is that: 24 strain gauges are sputtered on the cross beam and the force transmission table to form six sets of Wheatstone bridges, with five sets on the cross beam and one set on the force transmission table; a total of four strain gauges are sputtered separately on outer sides of two floating beams of the cross beam perpendicular to the X-axis, which are separately sputtered on both sides of each intersection between a floating beam and a corresponding main beam, to form a bridge circuit for measuring an acting force Fx in the X direction; a total of four strain gauges are sputtered separately on outer sides of two floating beams of the cross beam perpendicular to the Y-axis, which are separately sputtered on both sides of each intersection between a floating beam and a corresponding main beam, to form a bridge circuit for measuring an acting force Fy in the Y direction; a total of four strain gauges are sputtered separately on upper and lower surfaces of two main beams of the cross beam parallel to the X-axis and close to the center boss, to form a bridge circuit for measuring an acting force Fz in the Z direction; a total of four strain gauges are sputtered separately on upper and lower surfaces of two main beams of the cross beam parallel to the Y-axis and away from the center boss, to form a bridge circuit for measuring an applied moment Mx in the X direction; a total of four strain gauges are sputtered separately on upper and lower surfaces of two main beams of the cross beam parallel to the X-axis and away from the center boss, to form a bridge circuit for measuring an applied moment My in the Y direction; a total of four strain gauges are sputtered separately on both sides of the central axis in two side surfaces of the force transmission table perpendicular to the Y-axis and close to the center boss of the cross beam, to form a bridge circuit for measuring an applied moment Mz in the Z direction; and when a force/moment of a certain dimension acts on the sensor, an elastomer structure including the force transmission table and the cross beam is deformed and resistance values of strain gauges at corresponding positions change, so that output voltages of corresponding bridges are changed; and the value of the force/moment in each dimension can be obtained by measuring voltage changes.

The present disclosure features the following beneficial effects:

(1) the combined six-dimensional force sensor based on thin-film sputtering technology designed by the present disclosure avoids the problems of low stability and poor resistance to heat and humidity when a patch method is adopted for the multi-dimensional force sensor, and improves the stability of the sensor;

(2) a detachable independent structure between the force transmission table and the cross beam is designed in the present disclosure, each surface for strain gauge sputtering is designed as a plane with flat outer sides to meet process requirements of thin-film sputtering, and the sensor is simple in structure and easy to process; and (3) the combined six-dimensional force sensor based on thin-film sputtering technology designed by the present disclosure is based on the principle of resistance strain, and a rectangular beam structure is adopted for sensitive parts, thus having high measurement sensitivity.

DESCRIPTION OF THE EMBODIMENTS

Figure 1:
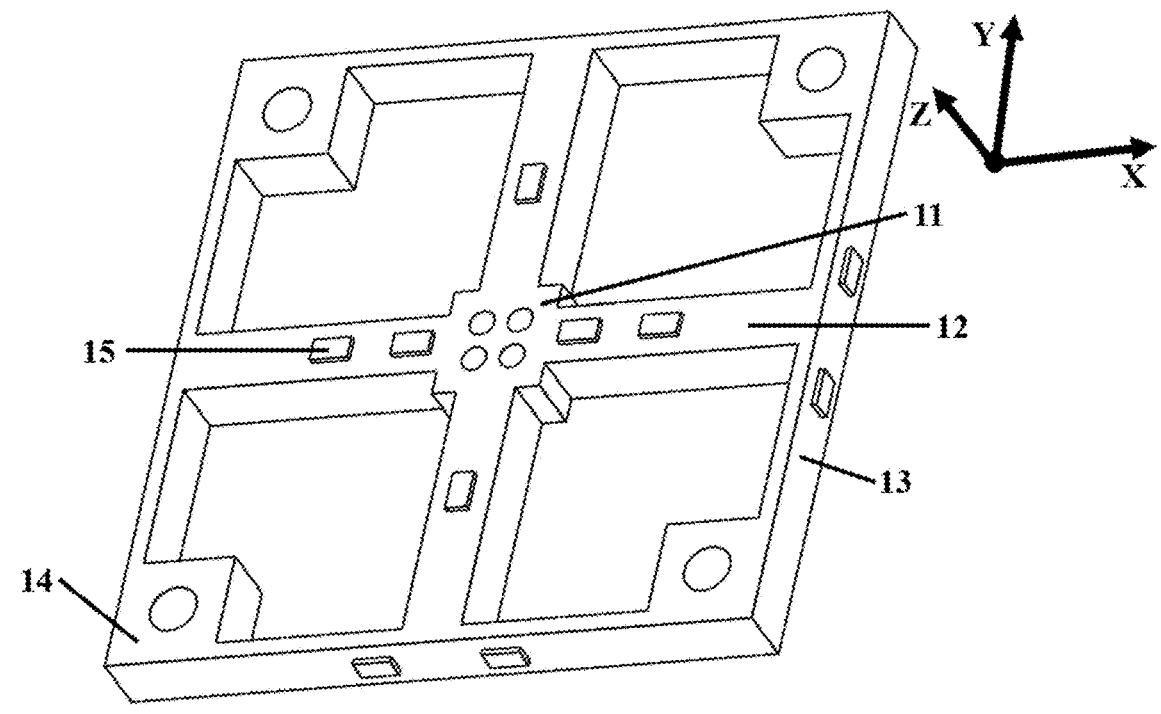
FIG. 1 is a schematic diagram of a structure of a cross beam of the present disclosure.

The present disclosure will be further described below with reference to the accompanying drawings and specific embodiments. It should be understood that the following specific embodiments are only used to illustrate the present disclosure and are not intended to limit the scope of the present disclosure.

A combined six-dimensional force sensor based on thin-film sputtering technology provided by the present disclosure includes a cross beam 10, a force transmission table 20, a top cover 50, a base 51, a bottom cover 52 and strain gauges 15. In order to describe the direction conveniently, a spatial Cartesian coordinate system as shown in the figure is established.

As shown in FIG. 1, the cross beam 10 includes a center boss 11, main beams 12, floating beams 13 and square corners 14, where the center boss 11 is a cylinder of a cuboid structure located at the center of the cross beam and has a square section; four connecting holes are formed on the center boss 11, and an upper surface of the center boss 11 is connected with the force transmission table 20 through the four connecting holes; four side surfaces of the center boss 11 are connected with the main beams 12; the main beams 12 are four rectangular beams with a rectangular section; one end of each main beam 12 is connected with the center boss 11, and the other end thereof is connected with a corresponding floating beam 13; the floating beams 13 located on peripheries of the cross beam are four rectangular thin-walled beams with a rectangular section; the center of an inner side surface of each floating beam 13 is connected with a corresponding main beam 12, and both ends thereof are connected with the corresponding square corners 14; the square corners 14 located at four corners of the cross beam are four cylinders of a cuboid structure with a square section; four connecting holes are formed on the square corners 14 for connection with a middle plate 53 of the base 51; and the center boss 11 is located in the middle of the cross beam 10, and the floating beam 13 is on a periphery of the cross beam 10.

Figure 2:
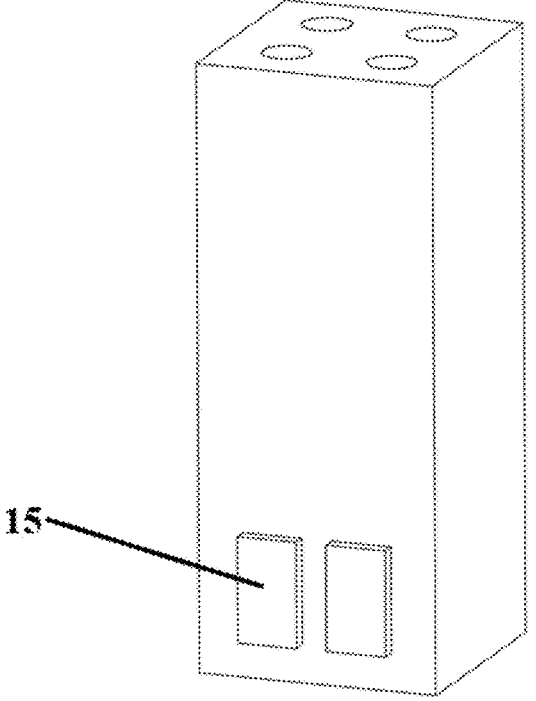
FIG. 2 is a schematic diagram of a structure of a force transmission table of the present disclosure.
Figure 3:
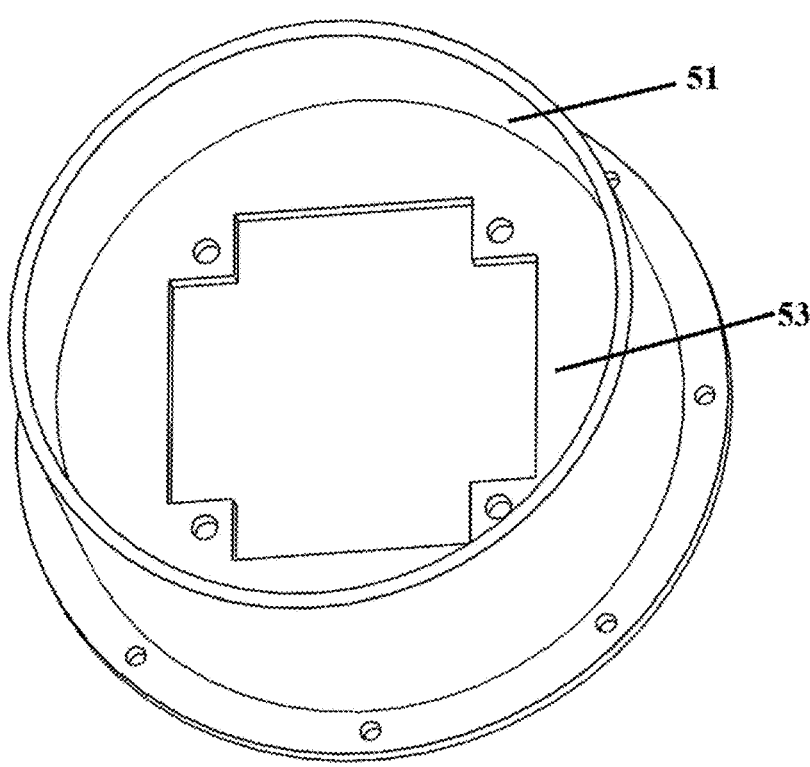
FIG. 3 is a schematic diagram of a structure of a base of the present disclosure.

As shown in FIG. 2, the force transmission table 20 is a cylinder of a cuboid structure and has a square section; and four threaded holes are formed separately on upper and lower surfaces of the force transmission table 20, the lower surface of the force transmission table 20 is connected with the upper surface of the center boss 11 of the cross beam 10 in a threaded manner, and the upper surface of the force transmission table 20 is connected with a lower surface of the top cover 50 in a threaded manner.

Figure 4:
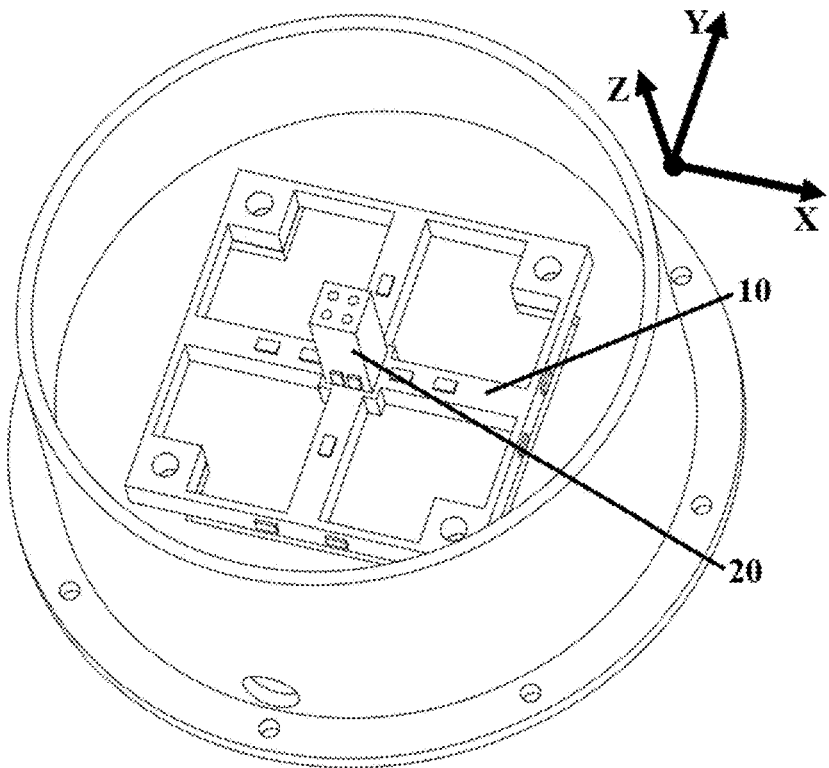
FIG. 4 is a schematic diagram 1 of assembly of the present disclosure.
Figure 5:
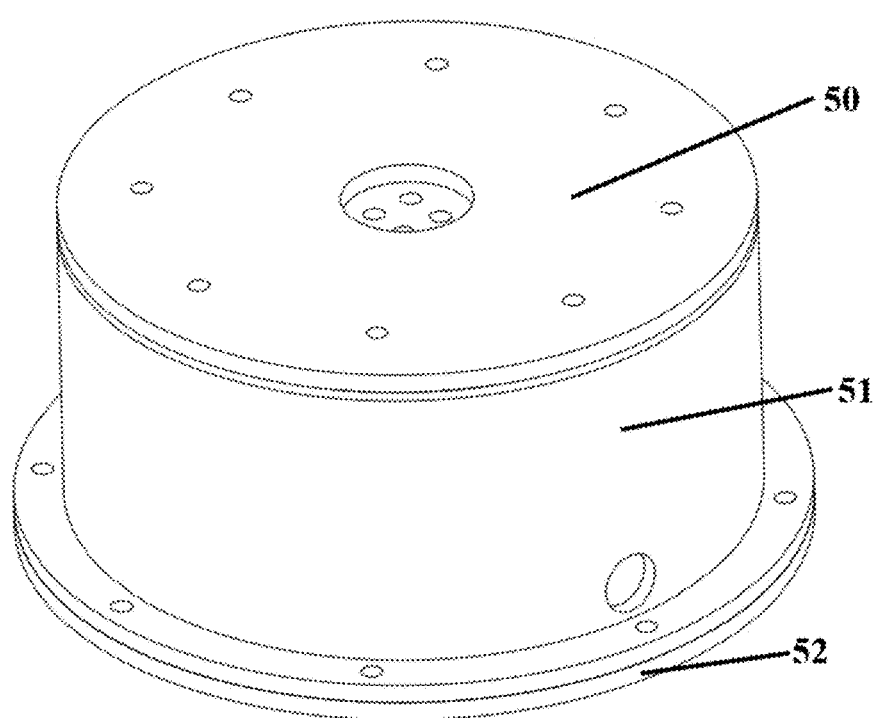
FIG. 5 is a schematic diagram 2 of assembly of the present disclosure.

As shown in FIG. 4, the force transmission table 20 is connected with the center boss 11 of the cross beam 10 through threads; the square corners 14 of the cross beam 10 are connected with the middle plate 53 of the base 51 through threads; the top cover 50 is connected with the force transmission table 20 through threads; and the bottom cover 52 and the base 51 are connected through mounting holes.

Types of processing materials can be freely selected for the cross beam 10, the force transmission table 20, the top cover 50, the base 51, the bottom cover 52 and other components included in the present disclosure, to make the actual performance of the sensor adapt to different index requirements. Therefore, the processing materials are not intended to limit the protection scope of the present disclosure.

Figure 6:
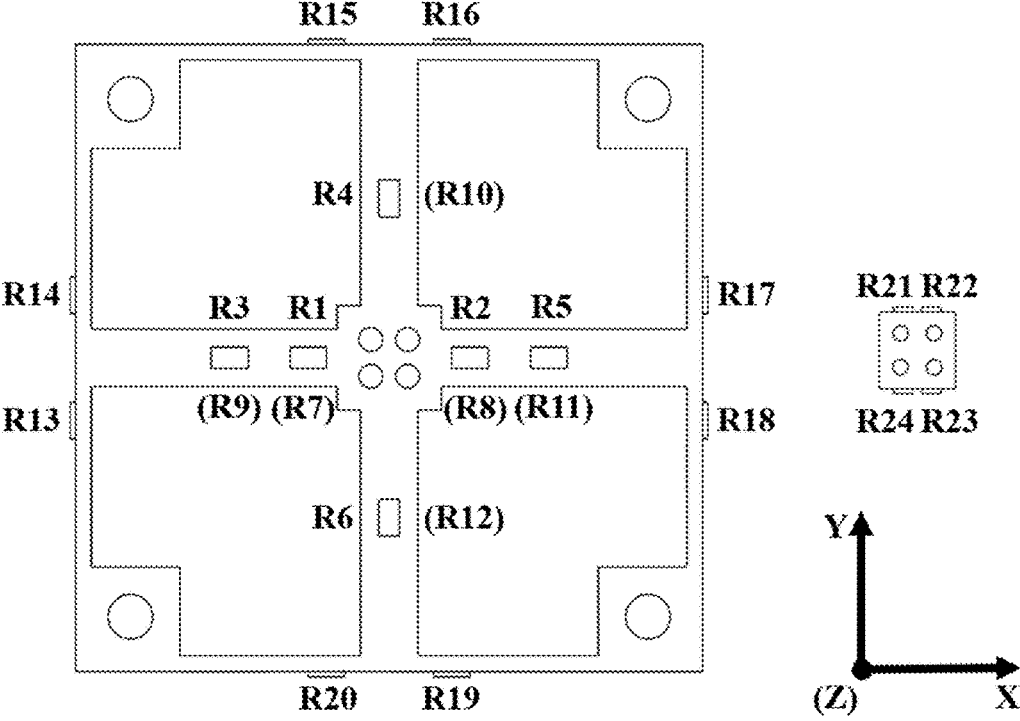
FIG. 6 is a schematic diagram of patch positions of strain gauges of the present disclosure.

FIG. 6 shows patch positions and corresponding numbers R1-R24 of a total of 24 strain gauges of the present disclosure. The strain gauges R1-R20 sputtered on the cross beam are identical except for their numbers, that is, they have the same initial resistance value and are all uniaxial strain gauges, the resistance value decreases during shrinking along the axial direction, and the resistance value increases when extending along the axial direction. The strain gauges R21-R24 sputtered on the force transmission table are torque-pattern strain gauges with the same initial resistance value, where the strain gauges R21 and R23 are sensitive to the strain with an angle of 45° against the axis, the resistance value decreases when shrinking along this direction, and the resistance value increases when extending along this direction. The strain gauges R22 and R24 are sensitive to the strain with an angle of 135° against the axis, the resistance value decreases when shrinking along this direction, and the resistance value increases when extending along this direction. Under the premise of ensuring no position interference, the strain gauges are sputtered at the positions where strain is as large as possible when each elastic part is stressed. The strain gauges R1 and R7 are sputtered separately on upper and lower surfaces of a main beam of the cross beam close to the center boss in the negative X direction, the strain gauges R2 and R8 are sputtered separately on upper and lower surfaces of a main beam of the cross beam close to the center boss in the positive X direction, the strain gauges R3 and R9 are sputtered separately on upper and lower surfaces of a main beam of the cross beam away from the center boss in the negative X direction, the strain gauges R5 and R11 are sputtered separately on upper and lower surfaces of a main beam of the cross beam away from the center boss in the positive X direction, the strain gauges R4 and R10 are sputtered separately on upper and lower surfaces of a main beam of the cross beam away from the center boss in the positive Y direction, the strain gauges R6 and R12 are sputtered separately on upper and lower surfaces of a main beam of the cross beam away from the center boss in the negative Y direction, the strain gauges R13 and R14 on the outer side of floating beam are sputtered separately on both sides of the intersection between a main beam and a floating beam of the cross beam in the negative X direction, the strain gauges R17 and R18 on the outer side of floating beam are sputtered separately on both sides of the intersection between a main beam and a floating beam of the cross beam in the positive X direction, the strain gauges R19 and R20 on the outer side of floating beam are sputtered separately on both sides of the intersection between a main beam and a floating beam of the cross beam in the negative Y direction, and the strain gauges R15 and R16 on the outer side of floating beam are sputtered separately on both sides of the intersection between a main beam and a floating beam of the cross beam in the positive Y direction; the strain gauges R23 and R24 are sputtered separately on both sides of the central axis in a side surface of the force transmission table in the negative Y direction close to the center boss of the cross beam, and the strain gauges R21 and R22 are sputtered separately on both sides of the central axis in a side surface of the force transmission table in the positive Y direction close to the center boss of the cross beam. Under the premise of ensuring no position interference, all strain gauges are sputtered at the positions where strain is as large as possible when each elastic part is stressed.

Figure 7:
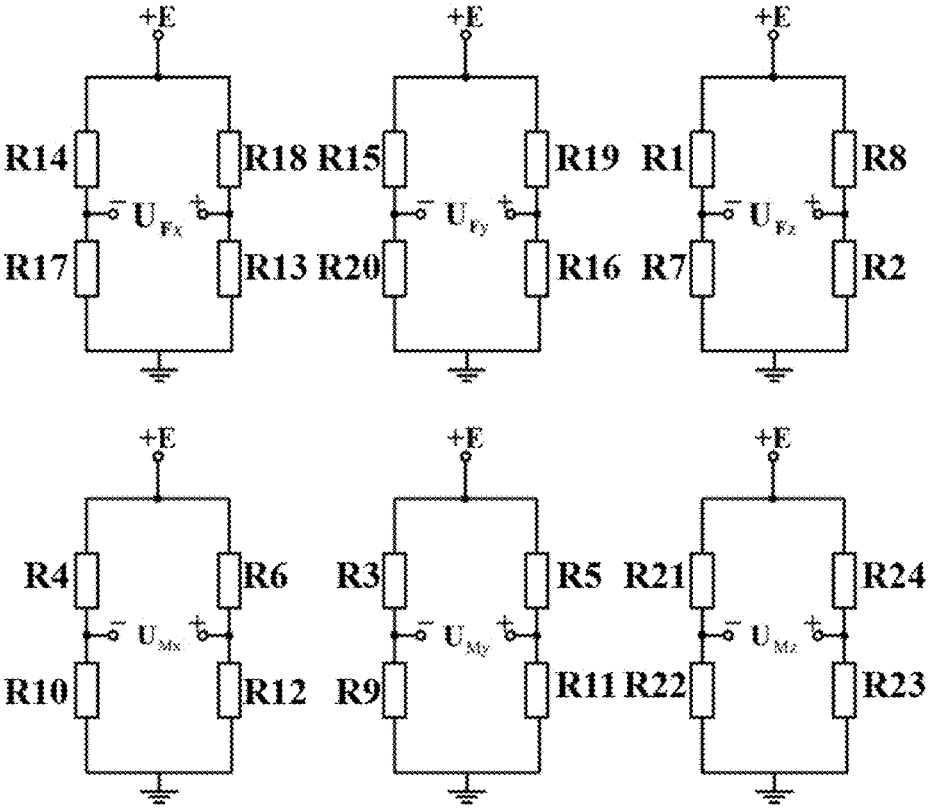
FIG. 7 is a schematic diagram of six sets of bridge circuits of the present disclosure.

FIG. 7 shows six sets of Wheatstone bridges formed by six channels of strain gauges. The strain gauges R13, R14, R17 and R18 form a Wheatstone bridge for measuring an acting force Fx in the X direction; the strain gauges R15, R16, R19 and R20 form a Wheatstone bridge for measuring an acting force Fy in the Y direction; the strain gauges R1, R2, R7 and R8 form a Wheatstone bridge for measuring an acting force Fz in the Z direction; the strain gauges R4, R6, R10 and R12 form a Wheatstone bridge for measuring an applied moment Mx in the X direction; the strain gauges R3, R5, R9 and R11 form a Wheatstone bridge for measuring an applied moment My in the Y direction; and the strain gauges R21, R22, R23 and R24 form a Wheatstone bridge for measuring an applied moment Mz in the Z direction.

The measurement principle of the six-dimensional force sensor is that: an input force/moment of a certain dimension acts on an elastomer structure including the force transmission table and the cross beam through the top cover, so that the cross beam is deformed and resistance values of strain gauges at corresponding positions change, thereby changing output voltages of corresponding bridges. In addition, due to the special design of the structure, output voltages of other dimensions will not change significantly, which effectively reduces the inter-dimensional coupling interference, thereby improving the measurement accuracy of the sensor. Therefore, during use, it is only necessary to measure voltage changes of all six channels to obtain a value of the force/moment in each dimension. It is assumed that R0 represents a value of zero-point resistance of the strain gauges, $\Delta R_{Fx}$, $\Delta R_{Fy}$, $\Delta R_{Fz}$, $\Delta R_{Mx}$, $\Delta R_{My}$ and $\Delta R_{Mz}$ represent resistance changes of the strain gauges under the action of Fx, Fy, Fz, Mx, My and Mz respectively, and E represents a bridge excitation voltage. Voltage changes of the output voltage of each channel are as follows:

$$\Delta U_{Fx} = \left( \frac{R13 + \Delta R_{Fx}}{R13 + R18} - \frac{R17 - \Delta R_{Fx}}{R14 + R17} \right)$$

$$E = \left( \frac{R0 + \Delta R_{Fx}}{2R0} - \frac{R0 - \Delta R_{Fx}}{2R0} \right) E = \frac{\Delta R_{Fx}}{R0} E$$

$$\Delta U_{Fy} = \left( \frac{R16 + \Delta R_{Fy}}{R16 + R19} - \frac{R20 - \Delta R_{Fy}}{R15 + R20} \right)$$

$$E = \left( \frac{R0 + \Delta R_{Fy}}{2R0} - \frac{R0 - \Delta R_{Fy}}{2R0} \right) E = \frac{\Delta R_{Fy}}{R0} E$$

$$\Delta U_{Fz} = \left( \frac{R2 + \Delta R_{Fz}}{R2 + R8} - \frac{R7 - \Delta R_{Fz}}{R1 + R7} \right)$$

$$E = \left( \frac{R0 + \Delta R_{Fz}}{2R0} - \frac{R0 - \Delta R_{Fz}}{2R0} \right) E = \frac{\Delta R_{Fz}}{R0} E$$

$$\Delta U_{Mx} = \left( \frac{R12 + \Delta R_{Mx}}{R6 + R12} - \frac{R10 - \Delta R_{Mx}}{R4 + R10} \right)$$

$$E = \left( \frac{R0 + \Delta R_{Mx}}{2R0} - \frac{R0 - \Delta R_{Mx}}{2R0} \right) E = \frac{\Delta R_{Mx}}{R0} E$$

$$\Delta U_{My} = \left( \frac{R11 + \Delta R_{My}}{R5 + R11} - \frac{R9 - \Delta R_{My}}{R3 + R9} \right)$$

$$E = \left( \frac{R0 + \Delta R_{My}}{2R0} - \frac{R0 - \Delta R_{My}}{2R0} \right) E = \frac{\Delta R_{My}}{R0} E$$

$$\Delta U_{Mz} = \left( \frac{R23 + \Delta R_{Mz}}{R23 + R24} - \frac{R22 - \Delta R_{Mz}}{R21 + R22} \right)$$

$$E = \left( \frac{R0 + \Delta R_{Mz}}{2R0} - \frac{R0 - \Delta R_{Mz}}{2R0} \right) E = \frac{\Delta R_{Mz}}{R0} E.$$

It should be noted that the above content is merely used for explaining the technical idea of the present disclosure, and cannot limit the protection range of the present disclosure. Those of ordinary skill in the art may also make some improvements and modifications without departing from the principle of the present disclosure, and these improvements and modifications should also fall within the scope of protection determined in the claims of the present disclosure.

What is claimed is:

1. A combined six-dimensional force sensor based on thin-film sputtering technology, comprising a cross beam, a force transmission table, a top cover, a base, a bottom cover and strain gauges; wherein the cross beam comprises a center boss, main beams, floating beams and square corners, the center boss is a cylinder of a cuboid structure located at a center of the cross beam and has a square section; four connecting holes are formed on the center boss, and an upper surface of the center boss is connected with the force transmission table through the four connecting holes; four side surfaces of the center boss are connected with the main beams; the main beams are four rectangular beams with a rectangular section; one end of each of the main beams is connected with the center boss, and the other end of the each of the main beams is connected with a corresponding floating beam; the floating beams located on peripheries of the cross beam are four rectangular thin-walled beams with a rectangular section; a center of an inner side surface of each of the floating beams is connected with a corresponding main beam, and both ends of the each of the floating beams are connected with the corresponding square corners; the square corners located at four corners of the cross beam are four cylinders of a cuboid structure with a square section; other four connecting holes are formed on the square corners for connection with a middle plate of the base; the center boss is located in a middle of the cross beam, and the each of the floating beams is on a periphery of the cross beam;

the force transmission table is a cylinder of a cuboid structure and has a square section; and four threaded holes are formed separately on an upper surface of the force transmission table and a lower surface of the force transmission table, the lower surface of the force transmission table is connected with the upper surface of the center boss of the cross beam in a threaded manner, and the upper surface of the force transmission table is connected with a lower surface of the top cover in a threaded manner;

the force transmission table is connected with the center boss of the cross beam through threads; the square corners of the cross beam are connected with the middle plate of the base through threads; the top cover is connected with the force transmission table through threads; and the bottom cover and the base are connected through mounting holes; and a number of the strain gauges is 24 with corresponding numbers R1-R24; the strain gauges R1-R20 sputtered on the cross beam are identical, the strain gauges R1-R20 have a same initial resistance value and are all uniaxial strain gauges, a resistance value decreases during shrinking along an axial direction, and the resistance value increases when extending along the axial direction; the strain gauges R21-R24 sputtered on the force transmission table are torque-pattern strain gauges with the same initial resistance value, where a strain gauge R21 and a strain gauge R23 are sensitive to a strain with an angle of 45° against an axis, the resistance value of the strain gauge R21 and the resistance value of the strain gauge R23 decreases when shrinking along a direction with an angle of 45° against the axis, and the resistance value increases when extending along the direction; a strain gauge R22 and a strain gauge R24 are sensitive to a strain with an angle of 135° against the axis, the resistance value of the strain gauge R22 and the resistance value of the strain gauge R24 decreases when shrinking along a direction with an angle of 135° against the axis, and the resistance value increases when extending along the direction; a strain gauge R1 and a strain gauge R7 are sputtered separately on an upper surface of a first one of the main beams and a lower surface of the first one of the main beams of the cross beam close to the center boss in a negative X direction, a strain gauge R2 and a strain gauge R8 are sputtered separately on an upper surface of a second one of the main beams and a lower surface of the second one of the main beams of the cross beam close to the center boss in a positive X direction, a strain gauge R3 and a strain gauge R9 are sputtered separately on the upper surface of the first one of the main beams and the lower surface of the first one of the main beams of the cross beam away from the center boss in the negative X direction, a strain gauge R5 and a strain gauge R11 are sputtered separately on the upper surface of the second one of the main beams and the lower surface of the second one of the main beams of the cross beam away from the center boss in the positive X direction, a strain gauge R4 and a strain gauge R10 are sputtered separately on an upper surface of a third one of the main beams and a lower surface of the third one of the main beams of the cross beam away from the center boss in a positive Y direction, a strain gauge R6 and a strain gauge R12 are sputtered separately on an upper surface of a fourth one of the main beams and a lower surface of the fourth one of the main beams of the cross beam away from the center boss in a negative Y direction, a strain gauge R13 and a strain gauge R14 on an outer side of a first one of the floating beams are sputtered separately on both sides of an intersection between the first one of the main beams and the first one of the floating beams of the cross beam in the negative X direction, a strain gauge R17 and a strain gauge R18 on an outer side of a second one of the floating beams are sputtered separately on both sides of an intersection between the second one of the main beams and the second one of the floating beams of the cross beam in the positive X direction, a strain gauge R19 and a strain gauge R20 on an outer side of a third one of the floating beams are sputtered separately on both sides of an intersection between the fourth one of the main beams and the third one of the floating beams of the cross beam in the negative Y direction, and a strain gauge R15 and a strain gauge R16 on an outer side of a fourth one of the floating beams are sputtered separately on both sides of an intersection between the third one of the main beams and the fourth one of the floating beams of the cross beam in the positive Y direction; a strain gauge R23 and a strain gauge R24 are sputtered separately on both sides of a central axis in a side surface of the force transmission table in the negative Y direction close to the center boss of the cross beam, and a strain gauge R21 and a strain gauge R22 are sputtered separately on both sides of the central axis in a side surface of the force transmission table in the positive Y direction close to the center boss of the cross beam; and under the premise of ensuring no position interference, all strain gauges are sputtered at positions where the strain is as large as possible when each of an elastic part is stressed.

2. The measurement method of the combined six-dimensional force sensor based on thin-film sputtering technology according to claim 1, wherein the 24 strain gauges are sputtered on the force transmission table and the cross beam to form six sets of Wheatstone bridges; the strain gauges R13, R14, R17 and R18 form a Wheatstone bridge for measuring an acting force Fx in a X direction; the strain gauges R15, R16, R19 and R20 form a Wheatstone bridge for measuring an acting force Fy in a Y direction; the strain gauges R1, R2, R7 and R8 form a Wheatstone bridge for measuring an acting force Fz in a Z direction; the strain gauges R4, R6, R10 and R12 form a Wheatstone bridge for measuring an applied moment Mx in the X direction; the strain gauges R3, R5, R9 and R11 form a Wheatstone bridge for measuring an applied moment My in the Y direction; and the strain gauges R21, R22, R23 and R24 form a Wheatstone bridge for measuring an applied moment Mz in the Z direction; an input force/moment of a certain dimension acts on the force transmission table and the cross beam through the top cover, the cross beam is deformed and resistance values of the 24 strain gauges at corresponding positions change, which results in the changes of the output voltages of corresponding bridges.

* * * * *